United States Patent
Teramoto et al.

(10) Patent No.: US 7,298,398 B2
(45) Date of Patent: Nov. 20, 2007

(54) IMAGE CAPTURING APPARATUS

(75) Inventors: Tougo Teramoto, Wakayama (JP); Junji Sato, Sakai (JP)

(73) Assignee: Konica Minolta Holdings, Inc., Tokyo (JP)

( * ) Notice: Subject to any disclaimer, the term of this patent is extended or adjusted under 35 U.S.C. 154(b) by 796 days.

(21) Appl. No.: 10/696,281

(22) Filed: Oct. 29, 2003

(65) Prior Publication Data
US 2004/0263681 A1  Dec. 30, 2004

(30) Foreign Application Priority Data
Jun. 26, 2003 (JP) ............................ P2003-182778

(51) Int. Cl.
*H04N 5/228* (2006.01)
(52) U.S. Cl. .................... 348/208.99; 348/143; 396/52
(58) Field of Classification Search ........... 348/208.99, 348/208.1, 208.3, 143, 154, 155, 335, 208.2, 348/208.4; 396/54, 52, 155, 53
See application file for complete search history.

(56) References Cited

U.S. PATENT DOCUMENTS 5,389,997 A * 2/1995 Ohishi ......................... 396/53
5,708,266 A * 1/1998 Soshi et al. .............. 250/231.14
6,816,288 B1 * 11/2004 Hashizume .................. 358/474
6,965,400 B1 * 11/2005 Haba et al. .............. 348/222.1
6,982,746 B1 * 1/2006 Kawahara ............... 348/208.99

FOREIGN PATENT DOCUMENTS

JP   10-009367 A   1/1998
JP   2003-033053 A 1/2003

* cited by examiner

*Primary Examiner*—Lin Ye
*Assistant Examiner*—Nelson D. Hernandez
(74) *Attorney, Agent, or Firm*—Sidley Austin LLP

(57) ABSTRACT

The present invention provides a technique capable of changing the image capturing direction of a camera at high speed while suppressing noise generated by resonance. At the time of changing the angle of the image capturing direction of a surveillance camera from a base angle to a first angle, if driving of both of a motor for panning and a motor for tilting is simply started simultaneously and completed simultaneously, there is a case such that the motor for panning generates resonance with the body of the surveillance camera or the like and noise becomes too loud. In such a case, the drive speed of the motor for panning, that is, the pulse rate is shifted to a high speed side on which resonance does not generate and the panning is finished first. Specifically, the angle of the image capturing direction is changed from the base angle to a second angle and, after that, changed from the second angle to the first angle.

13 Claims, 12 Drawing Sheets

F I G . 9
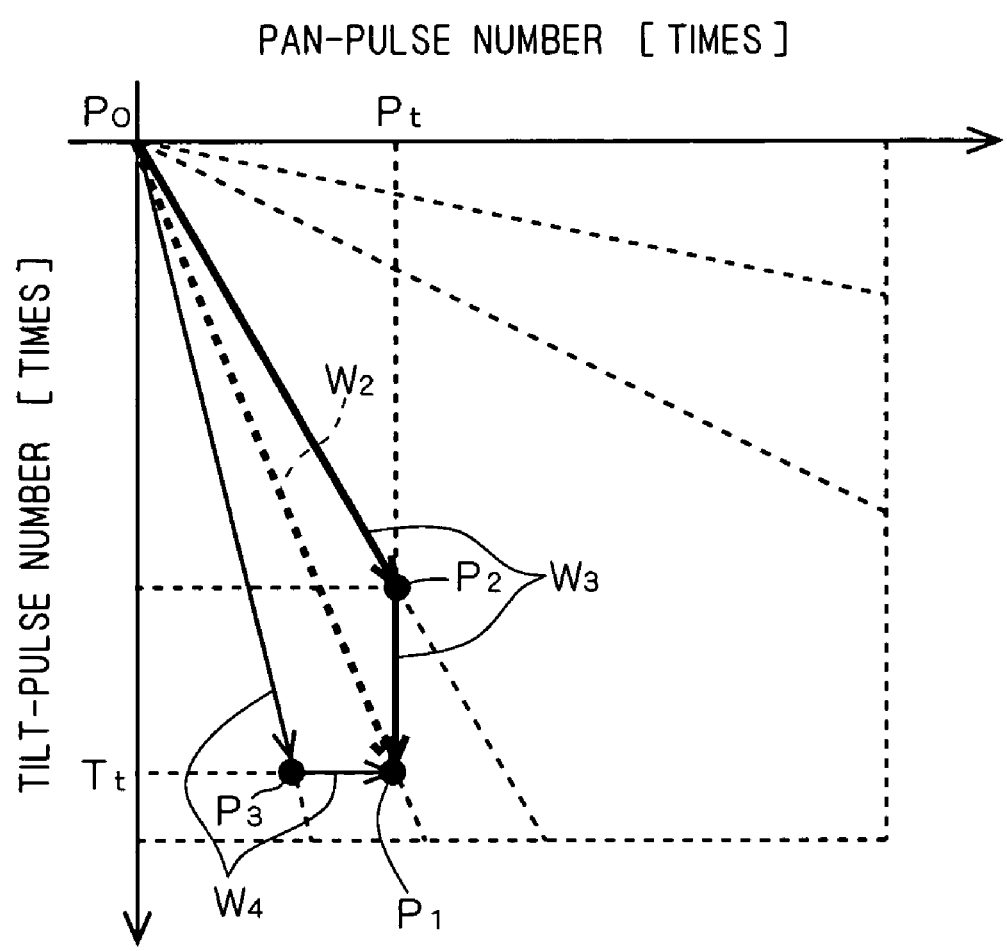

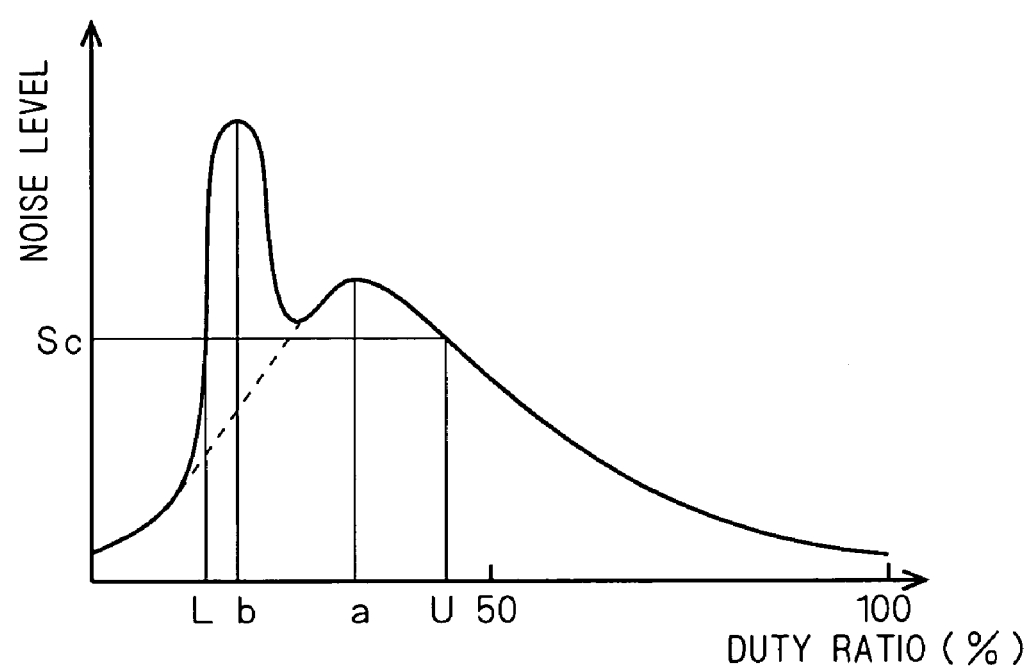
F I G . 1 5

IMAGE CAPTURING APPARATUS

This application is based on application No. 2003-182778 filed in Japan, the contents of which are hereby incorporated by reference.

BACKGROUND OF THE INVENTION

1. Field of the Invention

The present invention relates to an image capturing apparatus capable of changing its image capturing direction in a state where a body of the image capturing apparatus is fixed.

2. Description of the Background Art

Since a surveillance camera used by being mounted on the wall, the ceiling or the like of a room has to monitor a wide range, usually, the image capturing direction of the camera can be freely changed by the driving of various motors or the like by a remote control or the like.

Conventionally, such a surveillance camera is turnable around two axes of the horizontal axis and the vertical axis. For example, in the case of using a pulse motor as a drive source for turning the camera around each of the horizontal and vertical axes, by controlling the turn amount in the turn direction around the horizontal axis as a center (hereinafter, referred to as "tilting direction") and the turn amount in the turn direction around the vertical axis as a center (hereinafter, referred to as "panning direction") in accordance with the number of pulses given to the pulse motors, a change in the image capturing direction can be easily controlled.

However, generally, depending on the drive frequency, that is, the pulse rate (the number of pulses given per second, hereinafter, the unit will be abbreviated as "pps") given to a pulse motor, the drive source such as a pulse motor generates resonance with a body of the surveillance camera or the like and noise generates. Consequently, since it is desirable to reduce noise sound as much as possible in a quiet room or the like, the drive source is driven generally on the basis of a pulse rate lower than the drive frequency at which resonance is caused (hereinafter, referred to as "resonance frequency").

There are mainly two types of operating the surveillance camera. One of the types is a type of instructing only the driving direction and the other type is a type of directly instructing a target direction.

In the operation method of the former type, for example, by tilting an operation lever to a desired direction, the image capturing direction can be changed to the instructed direction. In order to stop the changing of the image capturing direction, it is sufficient to move the operation lever to the original position. In the operation method, the user has to operate the lever while watching a captured image and, when the image capturing direction reaches a desired direction, move the lever to the original position to stop the changing of the image capturing direction. When the changing speed of the image capturing direction is too fast, it is difficult to perform an accurate operation. Therefore, it is desirable to change the image capturing direction slowly.

On the other hand, in the operation method of the latter type, for example, a chart indicating a changeable range of the image capturing direction and the present image capturing direction are displayed on the screen of a personal computer or the like. By moving a cursor to a desired image capturing direction (target direction) and clicking the mouse, the image capturing direction can be automatically changed to the instructed target direction. In the operation method, when the target direction is directly designated, a turn in the panning direction and a turn in the tilting direction are simultaneously started and simultaneously completed, thereby enabling the image capturing direction to be changed to the designated target direction as fast as possible. Consequently, a time lag in changing of the image capturing direction is short and the operability is good.

In the operation method of the latter type, however, in order to change the image capturing direction to the target direction as fast as possible, when a pulse rate is simply changed, depending on the changing direction of the image capturing direction, the pulse rate given to one of the two pulse motors may enter the resonance frequency range and it causes large noise sound at the time of changing of the image capturing direction.

As a technique of suppressing the noise which will be generated during changing of the image capturing direction, a noise preventing technique has been proposed, which suppresses noise caused by resonance resulting from vibration of an intermediate gear during changing of the image capturing direction by inserting a friction member into the intermediate gear for transmitting a driving force of a stepping motor to prevent vibration of the gear (for example, Japanese Patent Application Laid-Open No. 10-9367 (1998)).

However, since the resonance which generates during changing of the image capturing direction due to the motor itself is larger than the resonance which generates due to the gear, only by the countermeasure of suppressing the resonance which generates due to the gear like the above-described noise preventing technique, generation of the resonance during changing of the image capturing direction, that is, generation of noise cannot be sufficiently suppressed.

SUMMARY OF THE INVENTION

The present invention is directed to an image capturing apparatus.

According to an aspect of the present invention, an image capturing apparatus includes: an image capturing part for capturing an image of a subject; a plurality of drivers for driving the image capturing part in a plurality of directions on the basis of a plurality of drive speed control values, respectively; an instructor for instructing a designated amount of operation of the image capturing part; a detector for detecting whether or not each drive speed control value for the designated operation is within a structural resonance range of the image capturing part, to determine an objective drive speed control value which is within the structural resonance range among the plurality of drive speed control values; a changing part for changing the objective drive speed control value to an alternative drive speed control value to reduce a driving time period of the objective driver required for the designated amount of operation; and a controller for controlling the plurality of drivers with the plurality of drive speed control values in which the objective drive speed control value is changed to the alternative speed control value.

Since the first drive speed control value set as a value which lies within the structural resonance changed of the image capturing apparatus among the plurality of drive speed control values is changed so that drive time of the first driver based on the first drive speed control value becomes shorter and the first driver is driven, while suppressing noise caused by resonance, the image capturing direction of the apparatus can be changed at high speed.

According to another aspect of the present invention, an image capturing apparatus includes: a first driver for changing a relative angle of an image capturing part to an image capturing apparatus body in a first direction; a second driver for changing the relative angle in a second direction; a controller for controlling respective driving operations of the first and second drivers; an instructor for instructing a designated amount of change in the relative angle for attaining a designated change in an image capturing direction; and a setting part for setting a first drive amount and a first drive speed control value for the first driver and setting a second drive amount and a second drive speed control value for the second driver on the basis of the designated amount of change in the relative angle instructed by the instructor. When resonance conditions that: i) the first drive amount is smaller than the second drive amount, and ii) the first drive speed control value is within a structural resonance range of the image capturing apparatus, are satisfied, the setting part changes the first drive speed control value to an alternative speed control value out of the resonance range. When the resonance conditions are satisfied, the controller controls the second driver drive on the basis of the second drive speed control value and controls the first driver drive on the basis of the alternative speed control value such that the first drive amount is attained by the first driver within a time period in which the second drive amount is attained by the second driver.

At the time of changing the image capturing direction only by a designated amount by changing the relative angle of the image capturing part to the image capturing apparatus body by the first and second drivers, in the case where the conditions are satisfied that the first drive amount of the first driver is smaller than the second drive amount of the second driver and the first drive speed control value for the first driver is a value within the structural resonance range of the image capturing apparatus, the first drive speed control value is changed to an alternative value out of the resonance range and the first driver is driven only by the first drive amount in the drive period of the second driver. Thus, while suppressing noise caused by resonance, the image capturing direction of the apparatus can be changed at high speed.

According to still another aspect of the present invention, an image capturing apparatus includes: a first driver for changing a relative angle of an image capturing part to an image capturing apparatus body in a first direction; a second driver for changing the relative angle in a second direction; a controller for controlling the first and second drivers; and an instructor for instructing a designated amount of change in the relative angle for attaining a designated change in an image capturing direction. The controller is operable to attain the designated amount of change in the relative angle with a combination of: a) a first control time period in which the controller controls the first and second drivers on the basis of first and second drive speed control values, respectively, and b) a second control time period following the first time period in which the controller controls the first and second drivers while stopping one of the first and second drivers. The first and second drive speed control values are determined out of a structural resonance range of the image capturing apparatus.

At the time of changing the image capturing direction only by a designated amount by changing the relative angle of the image capturing part to the image capturing apparatus body by the first and second drivers, from start of driving of the first and second drivers to a specific time point, the first and second drivers drive on the basis of drive speed control values for the first and second drivers set out of the structural resonance range of the image capturing apparatus. After the specific time point until a designated change in the image capturing direction is completed, one of the first and second drivers is stopped. Thus, while suppressing noise caused by resonance, the image capturing direction of the camera can be changed at high speed.

Therefore, an object of the present invention is to provide a technique capable of changing the image capturing direction of an image capturing apparatus at high speed while suppressing noise caused by resonance.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagram illustrating a motor control method in the case where the pulse rate of a motor which is driven at lower speed than another motor lies in a resonance range;

FIG. 15 is a diagram showing the relationship between the duty ratio of a drive signal given to the truss-structured actuator and noise.

DESCRIPTION OF THE PREFERRED EMBODIMENTS

Hereinafter, embodiments of the present invention will be described with reference to the drawings.

Outline of Surveillance Camera System

Figure 1:
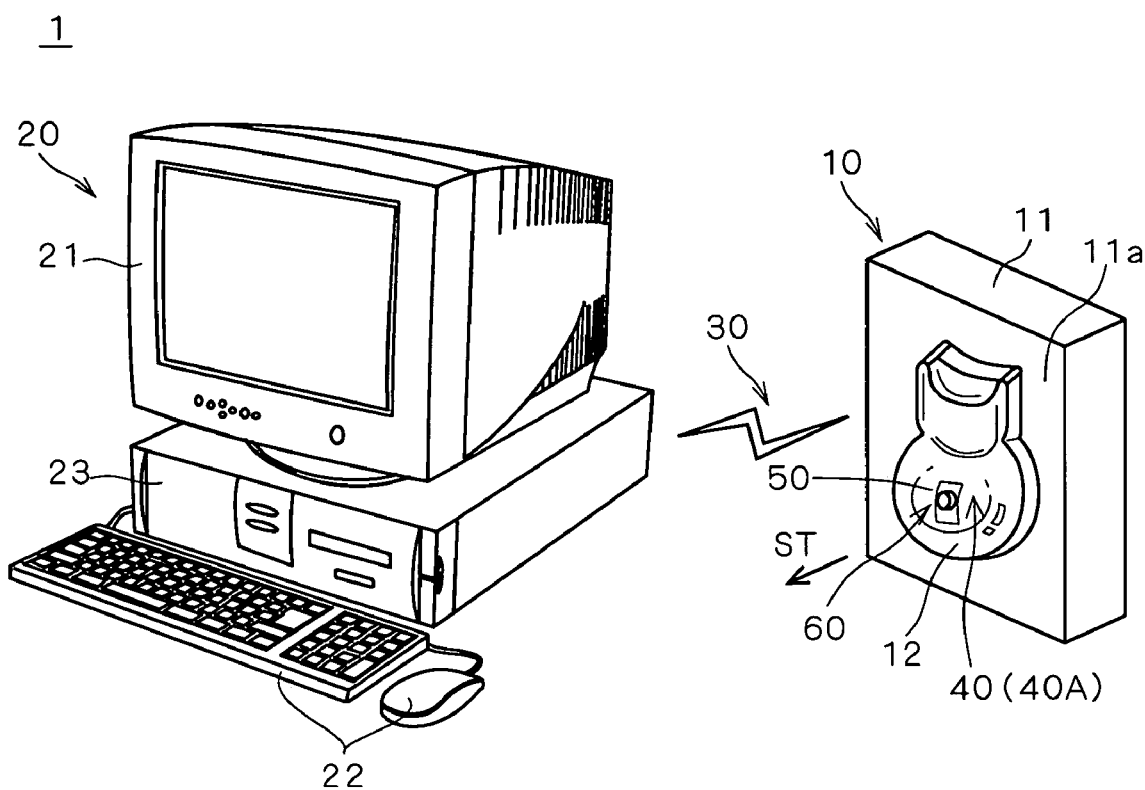
FIG. 1 is a diagram showing the outline of a surveillance camera system according to the present invention.

FIG. 1 is a diagram showing an outline of a surveillance camera system 1 as an example of an image capturing apparatus according to an embodiment of the present invention.

The surveillance camera system 1 has a surveillance camera 10 and a controller 20 for controlling the surveillance camera 10.

The surveillance camera 10 mainly has a housing 11, a transparent cover 12 constructed by a combination of an almost semi-spherical portion and an almost semi-cylindrical portion, and a camera unit 50 covered with the transparent cover 12.

The camera unit 50 has an image capturing unit 60 for acquiring image data of a subject, and a driving mechanism (hereinafter, referred to as "swing mechanism") 40 for changing the image capturing direction (the direction of the optical axis of the taking lens) of the image capturing unit 60.

The image capturing unit 60 faces the front in the state where a direction ST perpendicular to a face 11a on which the camera unit 50 is provided of the housing 11 is the image capturing direction. The image capturing direction of the image capturing unit 60 can be changed by the swing mechanism 40 by using the direction (front direction) ST as a reference. The concrete structure and the like of the swing mechanism 40 will be described later.

The housing 11 has various processing blocks for driving the image capturing unit 60, performing communication, and capturing and processing image data acquired by the image capturing unit 60. In the following, a part fixed to the wall, such as the housing 11 will be also referred to as the surveillance camera body.

The surveillance camera 10 and the controller 20 are connected to each other via a communication line 30 such as a LAN cable or another wireless line.

The controller 20 is constructed by a general personal computer or the like and has an operation unit 22 including a keyboard and a mouse, a monitor 21, and a control unit (so-called personal computer body) 23. The control unit 23 has therein a hard disk for storing image data captured by the surveillance camera 10 and a central processing unit for controlling various data communications with the surveillance camera 10 and the driving of the surveillance camera 10.

An operation screen for changing the image capturing direction of the image capturing unit 60 is displayed on the monitor 21 and the user variously operates the operation unit 22, thereby enabling an instruction of changing the image capturing direction only by an arbitrary amount to be given. That is, the operation unit 22 gives an instruction of changing the image capturing direction only by a designated amount in accordance with a change in the angle of the image capturing unit 60 relative to the surveillance camera body. The operation screen for changing the image capturing direction will be described later.

Swing Mechanism of Surveillance Camera

Figure 2:
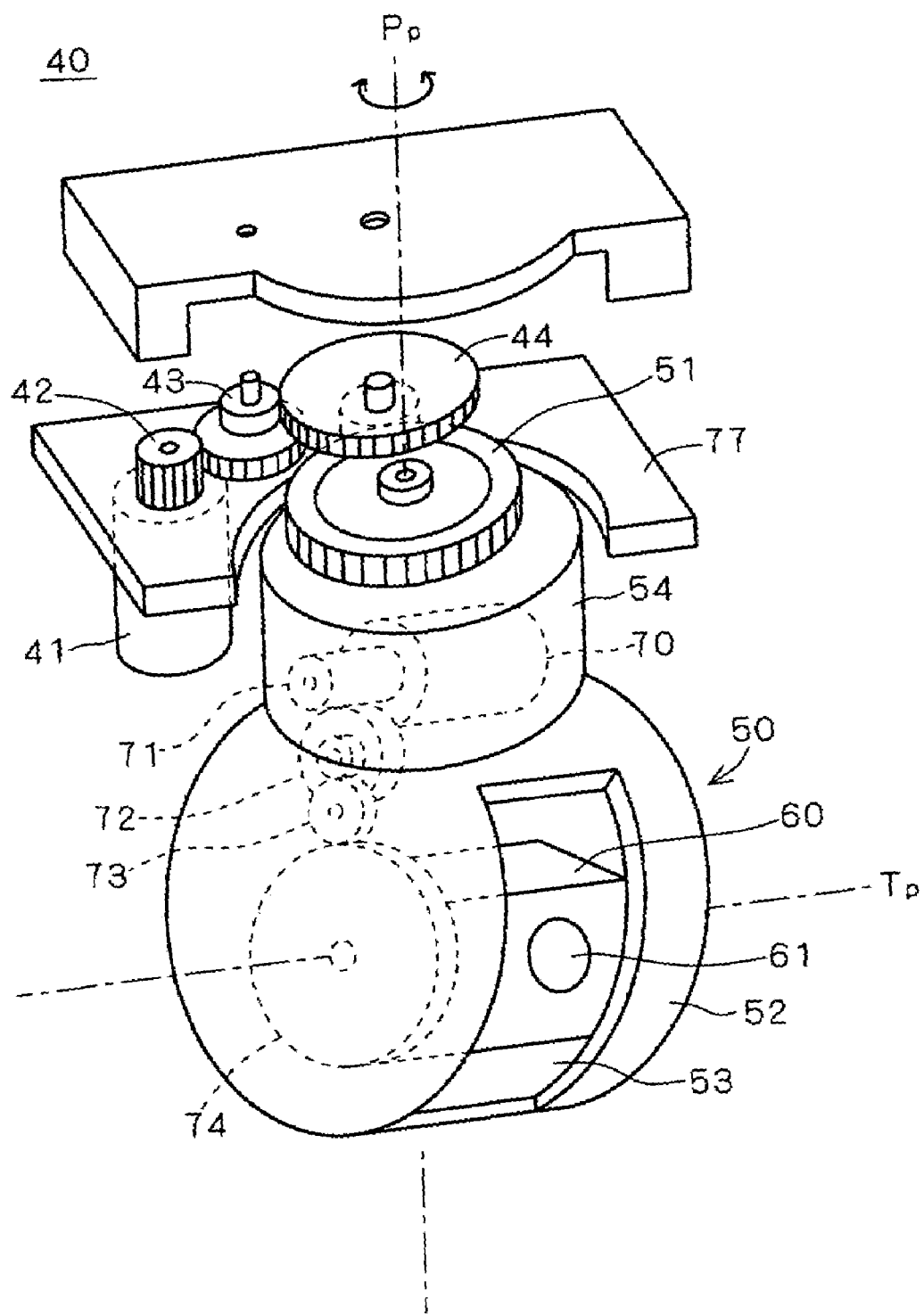
FIG. 2 is a diagram illustrating a swing mechanism of a surveillance camera.

FIG. 2 is a diagram for explaining the swing mechanism 40 of the surveillance camera 10. The image capturing unit 60 performs an operation (hereinafter, referred to as "panning operation") of rotation around an axis $P_p$ perpendicular to the ground (hereinafter, referred to as "panning axis") and an operation (hereinafter, referred to as "tilting operation") of rotation around an axis $T_p$ (hereinafter, referred to as "tilting axis") which is parallel to the ground. In other words, the swing mechanism 40 has a driving mechanism (hereinafter, referred to as "panning mechanism") for making the camera unit 50 perform the panning operation and a driving mechanism (hereinafter, referred to as "tilting mechanism") for making the camera unit 50 perform the tilting operation.

Specifically, the panning mechanism changes the relative angle of the image capturing unit 60 to the surveillance camera body including the housing 11 in a first direction around the panning axis (hereinafter, referred to as "panning direction). The tilting mechanism changes the relative angle of the image capturing unit 60 to the surveillance camera body in a second direction around the tilting axis (hereinafter, referred to as "tilting direction).

The details of the swing mechanism 40 will be described below with reference to FIG. 2.

The camera unit 50 has a shape of a combination of a cylindrical part 54 having an almost cylindrical shape and a spherical part 52 having an almost spherical shape.

In the spherical part 52, the image capturing unit 60 and a tilt large gear 74 integrally connected to the image capturing unit 60 are provided. Further, the spherical part 52 has a slit 53 in its front part. A light flux from the subject is incident on a taking lens 61 of the image capturing unit 60 without causing an eclipse.

In the cylindrical part 54, a tilt motor 70 constructed by a pulse motor is provided. The driving force of the tilt motor 70 is transmitted from a pinion gear 71 to the tilt large gear 74 via gears 72 and 73. By the rotation of the tilt large gear 74, the image capturing unit 60 turns around the tilting axis Tp as a center to change the image capturing direction vertically.

A pan motor 41 constructed by a pulse motor is mounted on a base plate 77 to be fixed to the housing 11, and the driving force of the pan motor 41 is transmitted from a pinion gear 42 to a gear 51 provided on the top face of the cylindrical part 54 via gears 43 and 44. The gear 51 is integrally connected to the camera unit 50, and the camera unit 50 itself rotates around the panning axis Pp by the rotation of the gear 51.

To change the image capturing direction, a change in the image capturing direction can be easily controlled by the total number of pulses given to the pulse motor by using the pan motor 41 and the tilt motor 70 taking the form of pulse motors.

Figure 3:
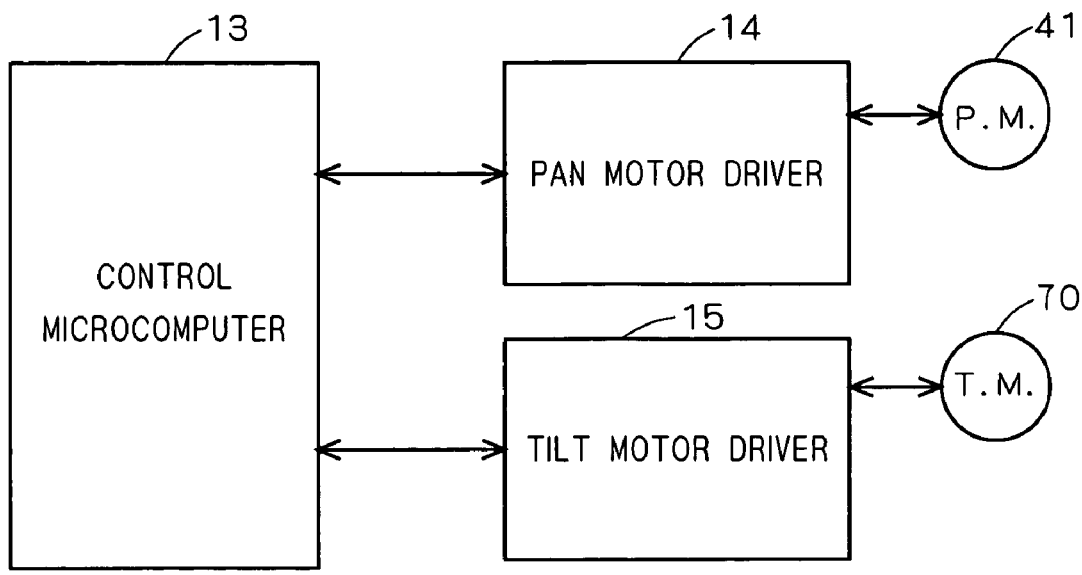
FIG. 3 is a block diagram showing the functional configuration of driving of the swing mechanism.

FIG. 3 is a block diagram showing the functional configuration regarding driving of the swing mechanism 40.

In the housing 11, as shown in FIG. 3, a control microcomputer 13 for receiving a control signal from the controller 20 and controlling the driving of the swing mechanism 40 in a centralized manner is provided. In the housing 11, a pan motor driver 14 for controlling the driving of the pan motor 41 and the tilt motor driver 15 for controlling the driving of the tilt motor 70 are provided.

By transmitting commands by serial communication from the control microcomputer 13 to the pan motor driver 14 and the tilt motor driver 15, the panning operation and the tilting operation can be controlled independently. That is, the control microcomputer 13 controls the driving of the panning mechanism and the tilting mechanism of the swing mechanism 40.

By freely setting and adjusting the pulse rates (also referred to as "first and second pulse rates") given to the pan motor 41 and the tilt motor 70 and the total number of pulses under control of the control microcomputer 13, the driving of the pan motor 41 and the tilt motor 70 can be controlled. That is, a change in the image capturing direction can be controlled easily and reliably.

The control microcomputer 13 also sets a drive amount of the panning mechanism (hereinafter, "panning amount (first drive amount)") and a pulse rate of the panning mechanism (hereinafter, "pan-pulse rate"), and a drive amount of the tilting mechanism (hereinafter, "tilting amount (second drive amount)) and a pulse rate of tilting mechanism (hereinafter, "tilt-pulse rate") on the basis of the instruction given by the operation unit 22.

The pulse rate is a value of controlling the driving speed (hereinafter, "drive speed control value") of the motors 41 and 70. In the following, the pan-pulse rate will be also referred to as a panning speed control value (first drive speed control value) and the tilt-pulse rate will be also referred to as a tilting speed control value (second drive speed control value).

Operation for Changing Image Capturing Direction

Figure 4:
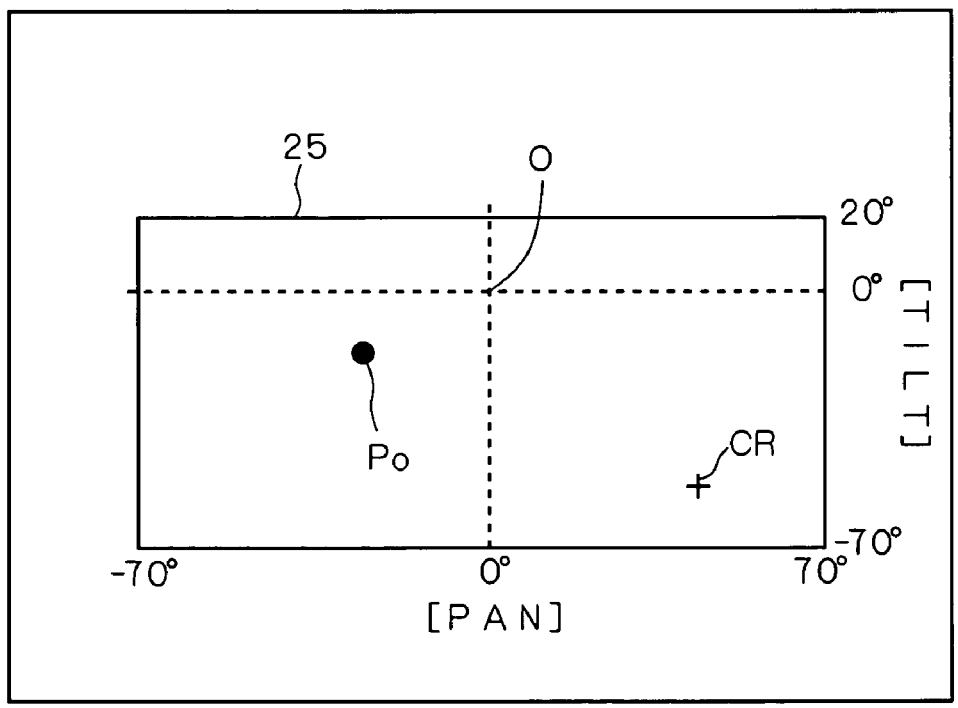
FIG. 4 is a diagram showing an operation screen for changing the image capturing direction.

FIG. 4 is a diagram showing an operation screen DS for changing the image capturing direction of the image capturing unit 60.

On the operation screen DS, a frame (camera changeable range frame) 25 showing the range in which the image capturing direction can be changed is displayed. The image capturing direction can be changed arbitrarily as long as it is shown in the camera changeable range frame 25.

The lateral direction of the camera changeable range frame 25 indicates the angle (hereinafter, "pan angle") in the panning operation direction (pan direction) of the image capturing direction in the case where the front direction ST is a reference (origin O). The vertical direction of the camera changeable range frame 25 indicates the angle (hereinafter, "tilt angle") in the tilting operation direction (tilt direction) of the image capturing direction in the case where the front direction ST is a reference (origin O). In the case where the image capturing direction is on a plane parallel to the ground, the tilt angle is 0°. In the case where the image capturing direction is on the plane vertical to both the wall face to which the housing 11 is attached and the ground face, the pan angle is 0°.

For example, as shown in FIG. 4, by using the front direction ST as a reference, the image capturing direction can be changed within the range from +70° to −70° in the panning direction and can be changed within the range from +20° to −70° in the tilting direction.

In FIG. 4, the present image capturing direction is a direction corresponding to the angle $P_0$. By operating the keyboard, mouse, or the like of the operation unit 22 to designate a next angle of the image capturing direction (target angle) by a cursor CR and clicking an execution button (in this case, the return key in the keyboard or the click button of the mouse), the angle of the image capturing direction can be changed to the designated angle (target angle). That is, the angle of the image capturing direction is changed to the angle designated by the user.

Control Method of Changing Image Capturing Direction

Figure 5:
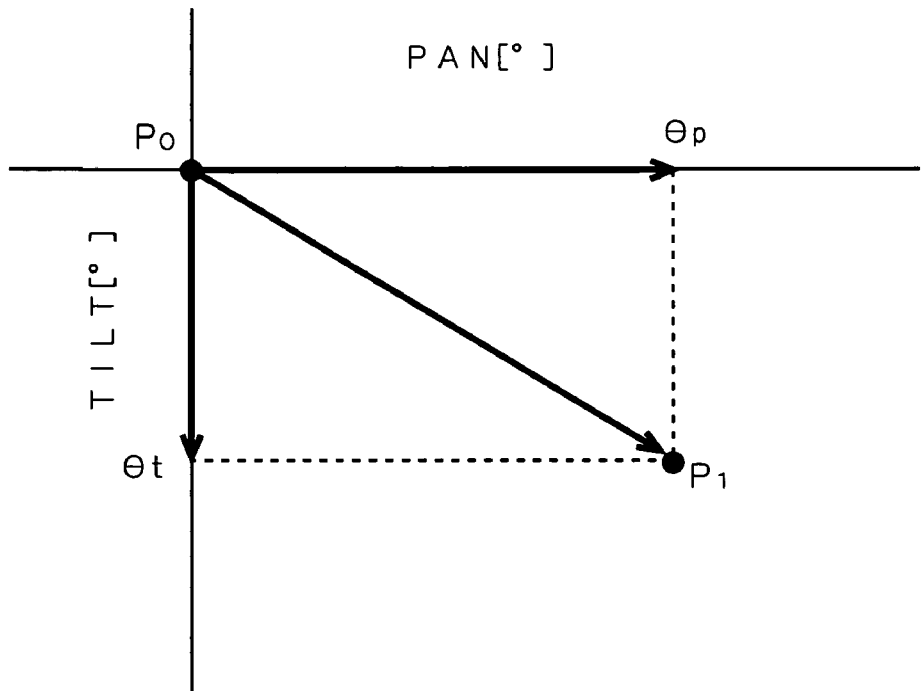
FIG. 5 is a diagram showing changing a relative angle of the image capturing direction to a body of the image capturing apparatus.

FIG. 5 is a diagram illustrating the angle of changing the image capturing direction. FIG. 5 shows the changing angle of the image capturing direction in the case where the angle of the image capturing direction is changed from an angle $P_0$ to an angle $P_1$. The angle $P_0$ is set as the origin. In FIG. 5, the lateral axis denotes the changing angle in the panning direction, and the vertical axis indicates the changing angle in the tilting direction. The changing angle in the panning direction in the case of changing the angle of the image capturing direction from the angle $P_0$ to the angle $P_1$ is indicated as an angle $\theta_p$ (in unit of "degrees") and the changing angle in the tilting direction is indicated as an angle $\theta_t$ (in unit of "degrees").

Figure 6:
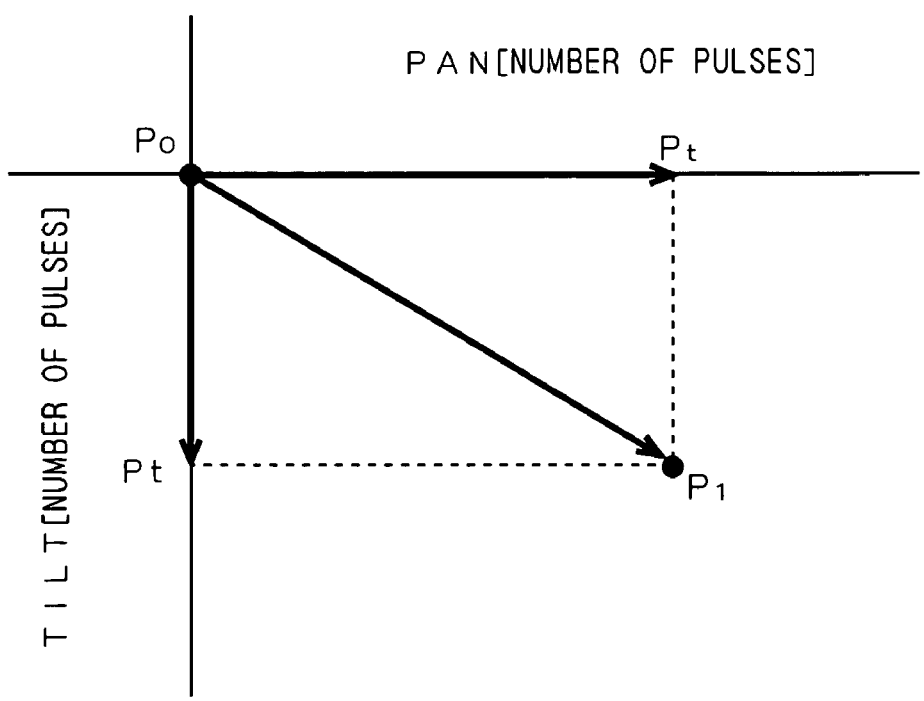
FIG. 6 is a diagram showing the changing the relative angle of the image capturing direction which is converted in the number of pulses given to a motor.

FIG. 6 is a diagram showing the numbers of pulses given to the pan motor 41 and the tilt motor 70 obtained by converting the changing angle of the image capturing direction in the case where the angle of the image capturing direction is changed from the angle $P_0$ to the angle $P_1$. In FIG. 6, the lateral axis indicates the number of pulses given to the pan motor 41, and the vertical axis indicates the number of pulses given to the tilt motor 70. In FIG. 6, in a manner similar to FIG. 5, the point corresponding to the angle $P_0$ is set as the origin. The total number of pulses given to the pan motor 41 (hereinafter, "pan-pulse number") for changing the angle of the image capturing direction from the angle $P_0$ to the angle $P_1$ is indicated as a pulse number $P_t$, and the total number of pulses given to the tilt motor 70 (hereinafter, "tilt-pulse number") for changing the angle of the image capturing direction from the angle $P_0$ to the angle $P_1$ is indicated as the pulse number $T_t$.

When the reduction ratio in the panning operation is set as $\eta_P$ (where $\eta_P > 1$) and the step angle of the pan motor 41 (angle per pulse) is set as $\theta_{SP}$, the pan—pulse number $P_t$ necessary for the panning operation is expressed by the following equation (1).

$$P_t = \theta_p \cdot \eta_P / \theta_{SP} \qquad (1)$$

When the reduction ratio in the tilting operation is set as $\eta_T$ (where $\eta_T > 1$) and the step angle of the tilt motor 70 (angle per pulse) is set as $\theta_{ST}$, the tilt—pulse number $T_t$ necessary for the tilting operation is expressed by the following equation (2).

$$T_t = \theta_T \cdot \eta_T / \theta_{ST} \qquad (2)$$

In the following, description will be given on assumption that the step angles of the pan motor 41 and the tilt motor 70 are the same ($\theta_s = \theta_{SP} = \theta_{ST}$) in the embodiment.

In the case where a pulse rate $P_i$ (the number of pulses per second, hereinafter, abbreviated as "pps") is given to the pan motor 41, time required for the panning operation is $P_t/P_i$ (seconds).

In the case of simultaneously starting the driving of the pan motor 41 and the tilt motor 70 at predetermined speeds and simultaneously stopping the driving, the pulse rate Ti to be given to the tilt motor 70 is equal to $P_i \cdot (T_t/P_t)$ (pps).

Figure 7:
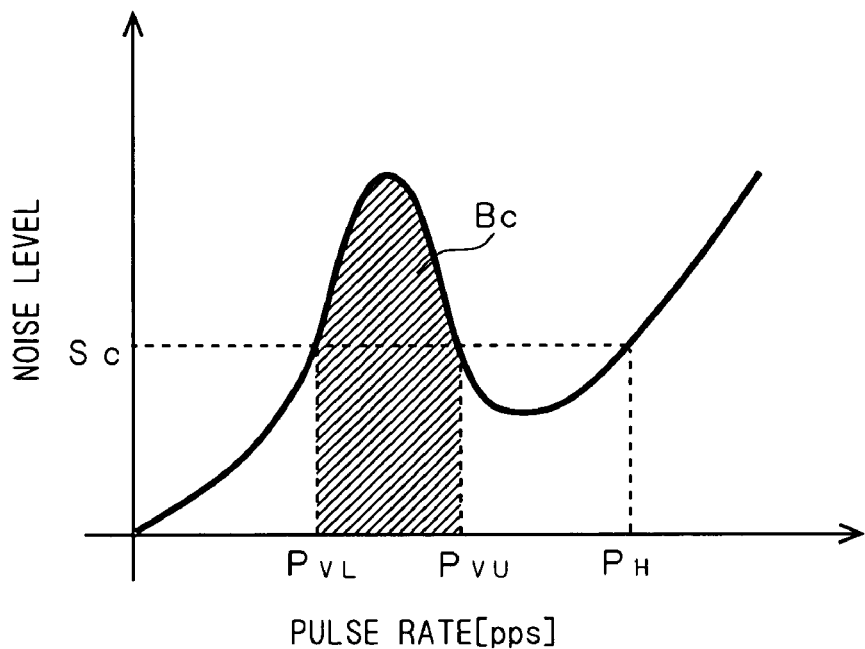
FIG. 7 is a diagram showing the relationship between the pulse rate given to the motor and noise level.

FIG. 7 is a diagram showing the relationship between the pulse rates to the pulse motors used as the pan motor 41 and the tilt motor 70 and noise level. In FIG. 7, the lateral axis indicates the pulse rate and the vertical axis indicates the noise level.

Generally, in the pulse motor, as the pulse rate becomes higher, the noise level tends to increase. Particularly, in a hatched range (hereinafter, "resonance range") Bc of the pulse rate from $P_{VL}$ to $P_{VU}$ in FIG. 7, resonance generates in the pulse motor itself or between the pulse motor and the device itself of the surveillance camera 10, and the noise level increases.

Therefore, when the limit level at which the noise level is permitted (hereinafter, "noise permissible level") is equal to or lower than noise level $S_c$, a range in which the pulse rate can be used is constructed by a range of the pulse rates (0 to $P_{VL}$) on the low than that in the resonance range Bc and a range of pulse rates ($P_{VU}$ to $P_H$) on the high side. As shown in FIG. 7, at the pulse rates $P_{VL}$, $P_{VU}$, and $P_H$, the noise level is the noise permissible level $S_c$, the pulse rate $P_H$ is the maximum pulse rate at which the noise level is permitted (hereinafter, referred to as "permissible maximum pulse rate").

Figure 8:
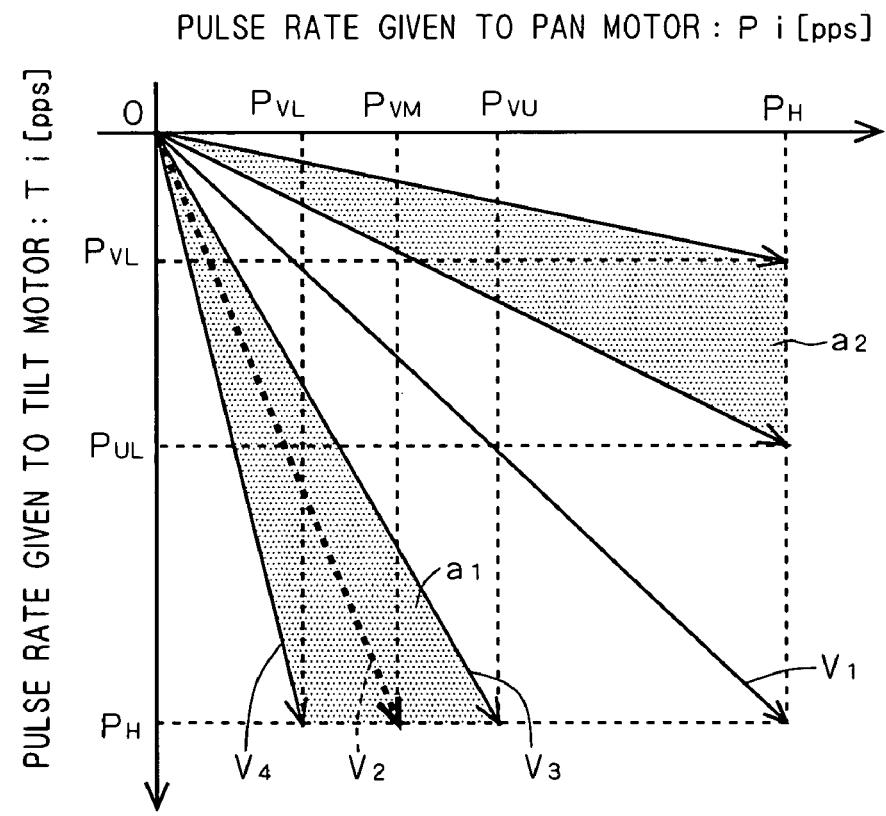
FIG. 8 is a diagram showing the relationship between a combination of a pulse rate given to a pan motor and a pulse rate given to a tilt motor and resonance.

FIG. 8 is a diagram illustrating the relationship between the combination of the pulse rate given to the pan motor 41 and the pulse rate given to the tilt motor 70 and resonance. In FIG. 8, the lateral axis indicates pulse rate $P_i$ (pps) given to the pan motor 41, and the vertical axis indicates pulse rate $T_i$ (pps) given to the tilt motor 70. In FIG. 8, a composite vector of the pulse rates given to the motors 41 and 70, that is, vectors (hereinafter, "drive speed vectors") $V_1$ to $V_4$ of the motors 41 and 70 are also shown. Further, a hatched area a, in FIG. 8 indicates an area of the drive speed vectors in which the pan motor 41 generates resonance and noise exceeding the noise permissible level $S_C$ generates. An area a2 indicates an area of the drive speed vectors in which the tilt motor 70 generates resonance and noise exceeding the noise permissible level $S_C$ generates.

As shown in FIG. 8, the drive speed vector $V_1$ is a drive speed vector in the case where both of the motors 41 and 70 are simultaneously driven at the maximum permissible pulse rate $P_H$. The drive speed vector $V_2$ is a drive speed vector in the case where the tilt motor 70 is driven at the maximum permissible pulse rate $P_H$ and the pan motor 41 is driven at the pulse rate $P_{VM}$ in the resonance range $B_C$.

Since the drive speed vector $V_2$ lies in the area $a_1$ in which the pan motor 41 which is driven at lower speed than the tilt motor 70 generates resonance, if the pan motor 41 and tilt motor 70 are driven with the drive speed vector $V_2$, noise exceeding the noise permissible level $S_C$ generates.

Therefore, in the surveillance camera system 1 according to the embodiment, in such a case, for example, until predetermined time elapses from start of driving, it is controlled so that the pulse rate given to the pan motor 41 lies out of the resonance range $B_C$.

Concretely, until predetermined time elapses since the start of driving, it is controlled so that the pulse rate given to the pan motor 41 becomes the minimum pulse rate $P_{VU}$ exceeding the resonance range $B_C$ and the driving in the panning direction is finished before the driving in the tilting direction. After the driving in the panning direction is completed, only the driving in the tilting direction is maintained, and a change in the image capturing direction is completed. In short, until the predetermined time elapses since the start of driving, it is controlled to change the drive speed vector $V_2$ to the drive speed vector $V_3$ so as to be out of the area $a_1$, in which the pan motor 41 generates resonance, thereby avoiding generation of resonance, that is, generation of noise exceeding the noise permissible level $S_C$.

A method of controlling a process of avoiding generation of resonance (generation of noise exceeding the noise permissible level $S_C$) (hereinafter, also referred to as "resonance avoiding process") will be described below.

FIG. 9 is a diagram for explaining a motor control method in the case where the pulse rate given to the pan motor 41 which is driven at lower speed than the tilt motor 70 is at a resonance frequency.

In FIG. 9, in a manner similar to FIG. 6, the changing angle of the image capturing direction in the case where the angle of the image capturing direction is changed from the angle $P_0$ to the angle $P_1$ is converted to the number of pulses given to each of the motors 41 and 70. In FIG. 9, in a manner similar to FIG. 6, a point corresponding to the angle $P_0$ is shown as the origin, and points corresponding to angles $P_1$ to $P_3$ in the image capturing direction are also shown. In FIG. 9, the lateral axis indicates the number of pulses given to the pan motor 41, and the vertical axis indicates the number of pulses given to the tilt motor 70. FIG. 9 further shows, in a manner similar to FIG. 6, the pan-pulse number $P_t$ given to the pan motor 41 and the tilt-pulse number $T_1$ given to the tilt motor 70 necessary to change the angle of the image capturing direction from the angle $P_0$ to the angle $P_1$.

FIG. 9 also shows loci $W_2$, $W_3$, and $W_4$ indicative of a state where the pan-pulse number and the tilt-pulse number are integrated (hereinafter, "pulse integration loci").

At the time of changing the angle of the image capturing direction from the angle $P_0$ to the angle $P_1$, when the motors 41 and 70 are driven so that the drive speed vector becomes the drive speed vector $V_2$ shown in FIG. 8 from the start of the change in the image capturing direction to the end of the change, the pulse integration locus becomes the locus $W_2$ which is directed like the drive speed vector $V_2$.

As described above, when the motors 41 and 70 are driven by the drive speed vector $V_2$, noise caused by resonance generates. In order to avoid generation of resonance, first, until application of the pan-pulse number necessary to change the image capturing direction is completed, the driving of the motors 41 and 70 is controlled so that the drive speed vector becomes the drive speed vector $V_3$ shown in FIG. 8. After completion of the application of the pan-pulse number necessary to change the image capturing direction, until the tilt-pulse number necessary to change the image capturing direction is completed, the pulses are given to the tilt motor 70.

Specifically, first, by changing the angle of the image capturing direction from the angle $P_0$ to the angle $P_2$ and, after that, changing from the angle $P_2$ to the angle $P_1$, the angle of the image capturing direction is changed from the angle $P_0$ to the angle $P_1$. At this time, the pulse integration locus becomes the locus $W_3$ and the pulse integration locus at the time of changing the angle of the image capturing direction from the angle $P_0$ to the angle $P_2$ is directed like the drive speed vector $V_3$.

In other words, as compared with the drive speed vector $V_2$, when the drive speed vector $V_3$ is set, the pulse rate given to the pan motor 41 is higher (faster). At the time point when the angle of the image capturing direction reaches the angle $P_2$, the angle of the image capturing direction in the panning direction has reached the target angle, so that the driving by the pan motor 41 is stopped. After that, only the tilt motor 70 rotates. At the time point when the angle of the image capturing direction reaches from the angle $P_2$ to the angle $P_1$, the driving of the tilt motor 70 is stopped.

That is, for example, when conditions are satisfied such that the panning amount is smaller than that tilting amount and the panning speed control value (in this case, the pan-pulse rate) of the pan motor 41 is a value in a structural resonance range of the surveillance camera 10 (hereinafter, also referred to as "resonance conditions"), the tilt motor 70 is driven by giving the pulse based on the tilting speed control value under control of the control microcomputer 13, and the pan motor 41 is driven by giving the pulse based on the panning speed control value which is changed. In this case, it is controlled so that, after completion of driving of a panning amount by the pan motor 41, the driving of a tilting amount by the tilt motor 70 is completed.

Further, in other words, to a specific time point when the driving of a designated amount (in this case, the panning amount) by one of the pan motor 41 and the tilt motor 70 (in this case, the pan motor 41) is completed since the start of driving of the pan motor 41 and the tilt motor 70, under control of the control microcomputer 13, by giving pulses based on the panning speed control value and the tilt drive speed control value as values out of the structural resonance region of the surveillance camera 10 to the pan motor 41 and tilt motor 70, thereby driving the pan motor 41 and the tilt motor 70. Until the changing of the image capturing direction only by the designated amount is completed after the specific time point, it is controlled so that one of the pan motor 41 and the tilt motor 70 (in this case, the pan motor 41) is stopped.

As described above, the angle of the image capturing direction is once changed from the angle $P_0$ to the angle $P_2$ and, after that, changed from the angle $P_2$ to the angle $P_1$. Therefore, as compared with the case of changing the angle from the angle $P_0$ directly to the angle $P_1$, the locus of changing of the image capturing direction becomes longer.

However, both in the case of changing the angle of the image capturing direction from the angle $P_0$ to the angle $P_1$ through the angle $P_2$ and in the case of changing the angle directly from the angle $P_0$ to the angle $P_1$, the same number of tilt-pulses is given to the tilt motor 70 at the maximum permissible pulse rate $P_H$, so that time required to reach the target angle becomes the same. That is, in this example, the drive time of the tilt motor 70 controls the rate of the whole direction change. Consequently, even if the drive conditions of the pan motor 41 are changed, the whole required time does not change if it is within the drive time of the tilt motor 70.

In the above, in the case where the pulse rate of the pulse motor which is driven at lower speed than another motor is in the resonance range, to suppress noise caused by resonance, the pulse rate of the pulse motor driven at lower speed than another is shifted to the high speed side exceeding the resonance range. Alternately, the pulse rate may be shifted to the low speed side below the resonance range.

Concretely, as shown in FIG. 8, for example, until predetermined time elapses since start of the driving, to make the pulse rate given to the pan motor 41 out of the resonance range $B_C$, in place of changing the drive speed vector $V_2$ to the drive speed vector $V_3$, the drive speed vector $V_2$ can be changed to the drive speed vector $V_4$. In this case, the pulse rate $P_{VL}$ is given to the pan motor 41, so that the pan motor 41 does not generate resonance.

FIG. 9 shows a pulse integration locus $W_4$ of the case where the drive speed vector is set to $V_4$. In the case where the drive speed vector $V_4$ is set, the pulse rate of the pan motor 41 is lower (slower) than that in the case where the drive speed vector $V_2$ is set. Consequently, at the time point when the angle of the image capturing direction reaches the angle $P_3$, driving to the tilting direction reaches to the target angle first, and the driving of the tilt motor 70 is stopped. After that, only the pan motor 41 rotates. At the time point when the angle of the image capturing direction reaches from the angle $P_3$ to the angle $P_1$, the driving of the pan motor 41 is stopped.

As described above, in the case where the angle of the image capturing direction is changed once from the angle $P_0$ to the angle $P_3$ and, after that, changed from the angle $P_3$ to the angle $P_1$, as compared with the case of directly changing the angle of the image capturing direction from the angle $P_0$ to the angle $P_1$, the locus of changing of the angle of the image capturing direction is longer. In the case of changing the angle of the image capturing direction from the angle $P_0$ to the angle $P_1$ through the angle $P_3$, as compared with the case of directly changing the angle of the image capturing direction from the angle $P_0$ to the angle $P_1$, time is required longer only by time required to change the angle of the image capturing direction from the angle $P_3$ to the angle $P_1$.

In other words, when the pulse rate to be given to the pulse motor which is driven at lower speed than another is in the resonance range at the time of changing the image capturing direction, if the pulse rate given to the pulse motor driven at lower speed than another is shifted to the low speed side so as to avoid the resonance range, as compared with the case of shifting the pulse rate to the high speed side, time required to change the image capturing direction becomes longer. As a result, time since the user instructs a change in the image capturing direction until the change in the image capturing direction is completed, that is, a time lag becomes longer, and a low operability state in which the user feels something strange is resulted.

Therefore, in the surveillance camera system 1 according to the embodiment, as described above, the control method is employed in which when the pulse rate given to the pulse motor which is driven at lower speed than another motor is in the resonance range, the pulse rate to be given to the pulse motor driven at lower speed than another is shifted to the high speed side so as to avoid the resonance range.

On the other hand, in the case where the pulse rate given to the pulse motor driven at lower speed than another is not in the resonance range, the pulse rate to be given to the pulse motor driven at lower speed than another is not changed. Specifically, for example, in the case where resonance conditions are not satisfied such that the pan drive amount is smaller than the tilt drive amount and the pan drive speed control value is a value out of the structural resonance range of the surveillance camera 10, under control of the control microcomputer 13, by giving the pulse based on the pan drive speed control value which is not changed to the pan motor 41, the pan motor 41 is driven and, by giving the pulse based on the tilt drive speed control value to the tilt motor 70, the tilt motor 70 is driven. At this time, it is controlled so that start of the driving of the pan drive amount of the pan motor 41 and start of the driving of the tilt drive amount of the tilt motor 70 become almost the same, and end of the driving of the pan drive amount of the pan motor 41 and end of the driving of the tilt drive amount of the tilt motor 70 become almost the same, thereby enabling the image capturing direction of the camera to be changed at higher speed in a state where resonance is not generated.

Flow of Operation of Changing Image Capturing Direction

Figure 10:
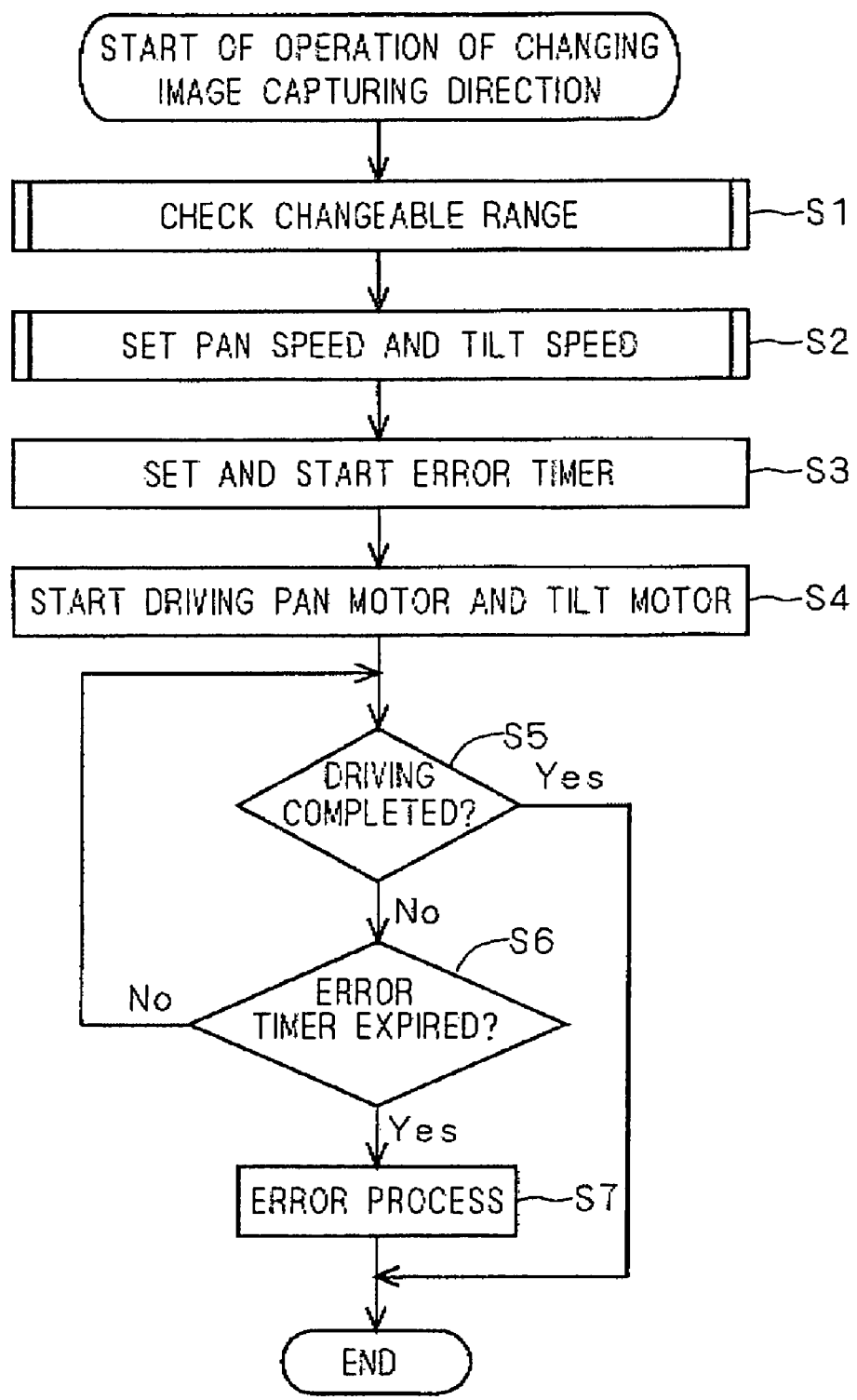
FIG. 10 is a flowchart showing the flow of operation of changing the image capturing direction.
Figure 11:
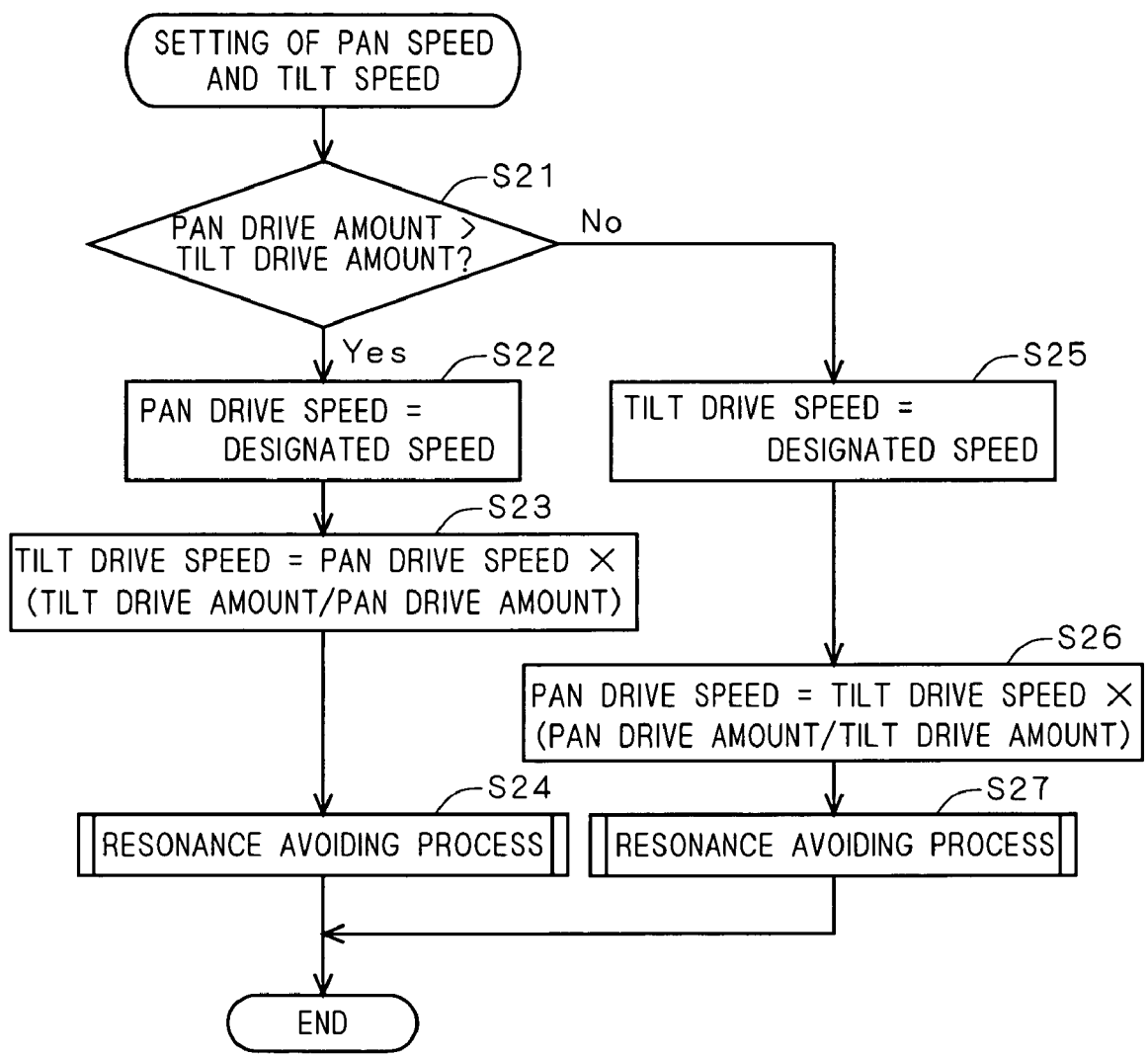
FIG. 11 is a flowchart showing the flow of operation of changing the image capturing direction.
Figure 12:
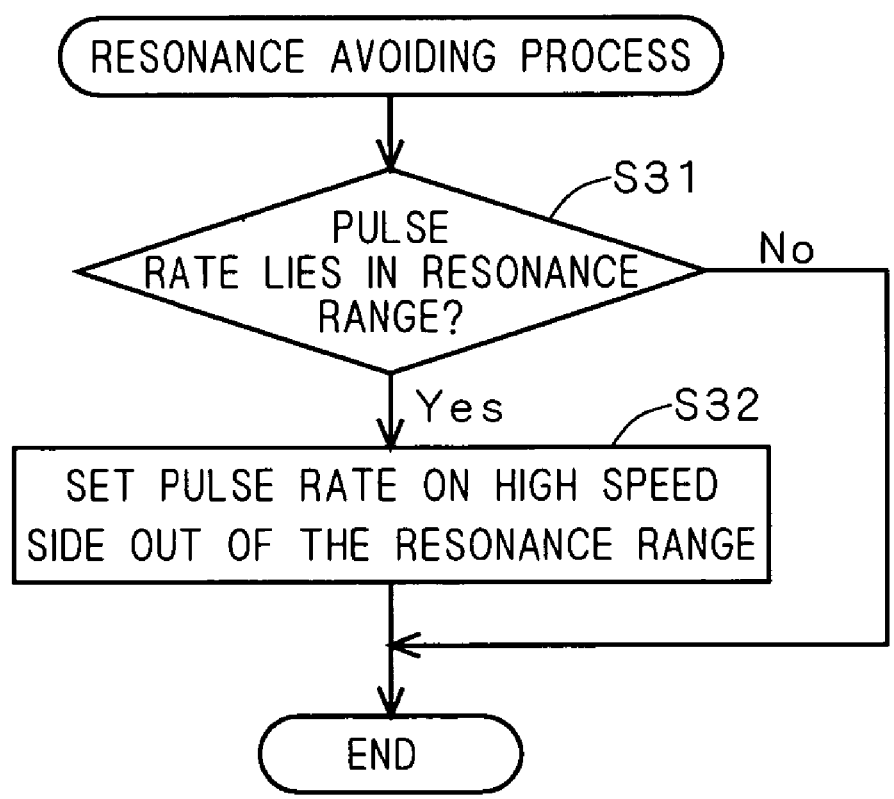
FIG. 12 is a flowchart showing the flow of operation of changing the image capturing direction.

FIGS. 10 to 12 show flowcharts of the flow of an operation of changing the image capturing direction. The operation flow is executed by a joint control performed by the controller 20 and the control microcomputer 13 in the surveillance camera 10.

When the user designates the next image capturing direction (target angle of the image capturing direction) on the operation screen DS shown in FIG. 4, the control microcomputer 13 shown in FIG. 3 can obtain the information of the target angle via the control unit 23, and calculate the rotation angle, specifically, a rotation direction, a rotation amount, and the total number of pulses of the panning operation and the tilting operation. The control microcomputer 13 executes the flow of the operation of changing the image capturing direction shown in FIGS. 10 to 12, thereby changing the image capturing direction by controlling the rotation of the motors 41 and 70 via the motor drivers 14 and 15.

For example, a high-speed mode for changing the image capturing direction at high speed, a low-speed mode of changing the image capturing direction at low speed, or the like is set by operating the operation unit 22 by the user, thereby enabling the pulse rate or the drive speed to be given to the motor 41 or 70 which rotates at higher speed to be designated. The drive speed of the pulse motor which can be set in the low-speed or high-speed mode, that is, the pulse rate can be set so as to be out of the resonance range.

The flow of the operation of changing the image capturing direction shown in FIGS. 10 to 12 will be described below.

In step S1, whether the target angle of the image capturing direction instructed by the user lies within a changeable range or not is determined. For example, when the user sets the cursor CR in the camera changeable range frame 25 on the operation screen DS shown in FIG. 4 and designates the desired angle of the image capturing direction (target angle), it is regarded that the target angle is within the changeable range, the program advances to step S2. On the other hand, when the target angle is out of the changeable range, the operation flow is finished and the system waits for the next designation of the target angle by the user.

In step S2, the setting routine for setting the speeds of the panning operation and the tilting operation is invoked and the pan and tilt speeds setting operation flow shown in FIG. 11 is executed.

In step S21 in FIG. 11, whether the pan drive amount is larger than the tilt drive amount or not is determined. In the case where the pan drive amount is larger than the tilt drive amount, the program advances to step S22. In the case where the pan drive amount is equal to or smaller than the tilt drive amount, the program advances to step S25.

First, the case where the program advances from step S21 to step S22 will be described.

In step S22, the rotation speed of the panning operation (pan drive speed) for the larger drive amount is set, and the program advances to step S23. In this case, as the pulse rate given to the pan motor 41, the pulse rate corresponding to the drive speed designated by the user is set.

In step S23, the rotation speed in the tilt direction (tilt drive speed), that is, the pulse rate given to the tilt motor 70 is set in accordance with the following expression (3), and the program advances to step S24.

Tilt drive speed=Pan drive speed×(Tilt drive amount/ Pan drive amount)  (3)

In step S24, by executing the resonance avoiding process flow shown in FIG. 12, when the pulse rate set in step S23 lies within the resonance range, the resonance avoiding process is performed.

In step S31 shown in FIG. 12, whether the pulse rate (drive speed) set in step S23 lies within the resonance range or not is determined. In the case where the pulse rate (drive speed) is within the resonance range, the program advances to step S32. In the case where the pulse rate is out of the resonance range, the resonance avoiding process flow and the pan and tilt speeds setting operation flow are finished and the program advances to step S3.

In step S32, the pulse rate (drive speed) set in step S23 is changed to the high speed side so as to be out of the resonance range, the resonance avoiding process flow and the pan and tilt speeds setting operation flow are finished, and the program advances to step S3. In this case, for example, the pulse rate is replaced to $P_{VU}$ shown in FIG. 7.

Specifically, when the tilt drive amount is smaller than the pan drive amount and, further, the pulse rate of the tilting operation is a value within the resonance range, the control microcomputer 13 changes the tilt drive speed control value to a value out of the resonance range. Concretely, the tilt-pulse rate is changed to the value $P_{VU}$ exceeding the maximum value of the resonance range.

The case where the program advances from step S21 to step S25 will now be described.

In step S25, the rotation speed in the tilting operation (tilt drive speed) for the larger drive amount is set, and the program advances to step S26. The pulse rate to be given to the tilt motor 70 is set to the pulse rate corresponding to the drive speed designated by the user.

In step S26, the rotation speed in the pan direction (pan drive speed), that is, the pulse rate to be given to the pan motor 41 is set in accordance with the following equation (4), and the program advances to step S27.

Pan drive speed=Tilt drive speed×(Pan drive amount/ Tilt drive amount)  (4)

In step S27, by executing the resonance avoiding process flow shown in FIG. 12 in a manner similar to step S24, in the case where the pulse rate set in step S26 is in the resonance range, the above-described resonance avoiding process is performed.

In step S31 shown in FIG. 12, whether the pulse rate (drive speed) set in step S26 lies within the resonance range or not is determined. If the pulse rate (drive speed) is within the resonance range, the program advances to step S32. If the pulse rate is out of the resonance range, the resonance avoiding process flow and the pan and tilt speeds setting operation flow are finished, and the program advances to step S3.

In step S32, the pulse rate (drive speed) set in step S26 is changed to the pulse rate (drive speed) on the high speed side so as to be out of the resonance range, the resonance avoiding process flow and the pan and tilt speeds setting operation flow are finished, and the program advances to step S3. For example, the pulse rate is replaced to $P_{VU}$ shown in FIG. 7.

Specifically, when the resonance conditions are satisfied such that the pan drive amount is smaller than the tilt drive amount and, further, the pan-pulse rate is a value in the structural resonance range of the surveillance camera 10, the control microcomputer 13 changes the drive speed control value (pan-pulse rate) of the panning operation to a value out of the resonance range (alternative speed control value). Concretely, the pan-pulse rate is changed to the value $P_{VU}$ exceeding the maximum value of the structural resonance range of the surveillance camera 10.

In step S3, a timer (error timer) for detecting an operation error of the panning operation and the tilting operation is set and started. In this case, time required to change the angle of the image capturing direction to the target angle (changing required time) is calculated from each drive amount and each pulse rate, for example, time twice as long as the changing required time is set as error time, and counting is started from start of changing the angle until error time elapses.

In step S4, the pulse rate and the total number of pulses of each of the panning operation and the tilting operation are designated, commands for starting the driving of the motors 41 and 70 are transmitted to the motor drivers 14 and 15 to start the driving of the motors 41 and 70, and the program advances to step S5.

In step S5, whether the driving of the motors 41 and 70 has been completed or not is determined. The control microcomputer 13 waits for a signal (drive complete signal) indicative of completion of the driving on the basis of the designated number of pulses returned from each of the motor drivers 14 and 15. If the control microcomputer 13 does not receive the drive complete signal, the program advances to step S6. If the control microcomputer 13 receives the drive complete signal, the flow of the operation of changing the image capturing direction is finished.

In step S6, whether the error timer expires or not is determined. In this case, whether the error time has elapsed since start of the error timer or not is determined. If the error time has not elapsed yet, it is regarded that the error time does not expire and the program returns to step S5. On the other hand, if the error time has elapsed, it is regarded that the error time expires and the program advances to step S7.

In step S7, an error process is performed and the flow of the operation of changing the image capturing direction is finished. The error process is a so-called initializing process of resetting the image capturing direction to the front direction irrespective of an instruction of the image capturing direction by the user and waiting for the next instruction of the image capturing direction. Specifically, the control microcomputer 13 waits for the drive complete signal to be sent. If the error timer expires before the drive complete signal is received, it is determined that an error generates in the operation of changing the image capturing direction and the error process is performed.

As described above, in the surveillance camera system 1 according to the embodiment, for example, if the pan drive amount is smaller than the tilt drive amount and the pan-pulse rate lies within the structural resonance range of the surveillance camera 10 at the time of changing the image capturing direction only by a designated amount, the pan-pulse rate is changed to an alternative value out of the resonance range (in this case, the value $P_{VU}$ exceeding the maximum value of the resonance range). By giving the pulse based on the tilt-pulse rate, the tilt motor 70 is driven. By giving the pulse based on the changed pan-pulse rate, the pan motor 41 is driven. After completion of driving of the pan drive amount by the pan motor 41, driving of the tilt drive amount by the tilt motor 70 is completed. As a result, while suppressing noise caused by resonance, the image capturing direction of the camera can be changed at high speed.

In other words, at the time of changing the image capturing direction, in a period from the start of driving of the pan motor 41 and the tilt motor 70 until a specific time point at which the driving of one of the motors (in this case, the pan motor 41) is completed, the pan motor 41 and the tilt motor 70 are driven so that the pulse rate given to the pan motor 41 and that given to the tilt motor 70 are out of the resonance range. After the specific time point at which the driving of one of the motors is completed and until the change in the image capturing direction of the designated amount is completed, it is controlled so as to stop one of the pan motor 41 and the tilt motor 70 (in this case, the pan motor 41). As a result, while suppressing noise caused by resonance, the image capturing direction of the camera can be changed at high speed.

Modifications

Although the embodiment of the present invention has been described above, the present invention is not limited to the above description.

For example, although the pulse motor is used as the swing mechanism 40 for changing the image capturing direction, the present invention is not limited to the pulse motor. Another driving means such as a trussed actuator may be used. For example, a technique using a truss-structured actuator as another driving means is disclosed in Japanese Patent Application Laid-Open No. 2001-54289. In the following, a swing mechanism 40A including the truss-structured actuator, the resonance range, and the like will be described.

Figure 13:
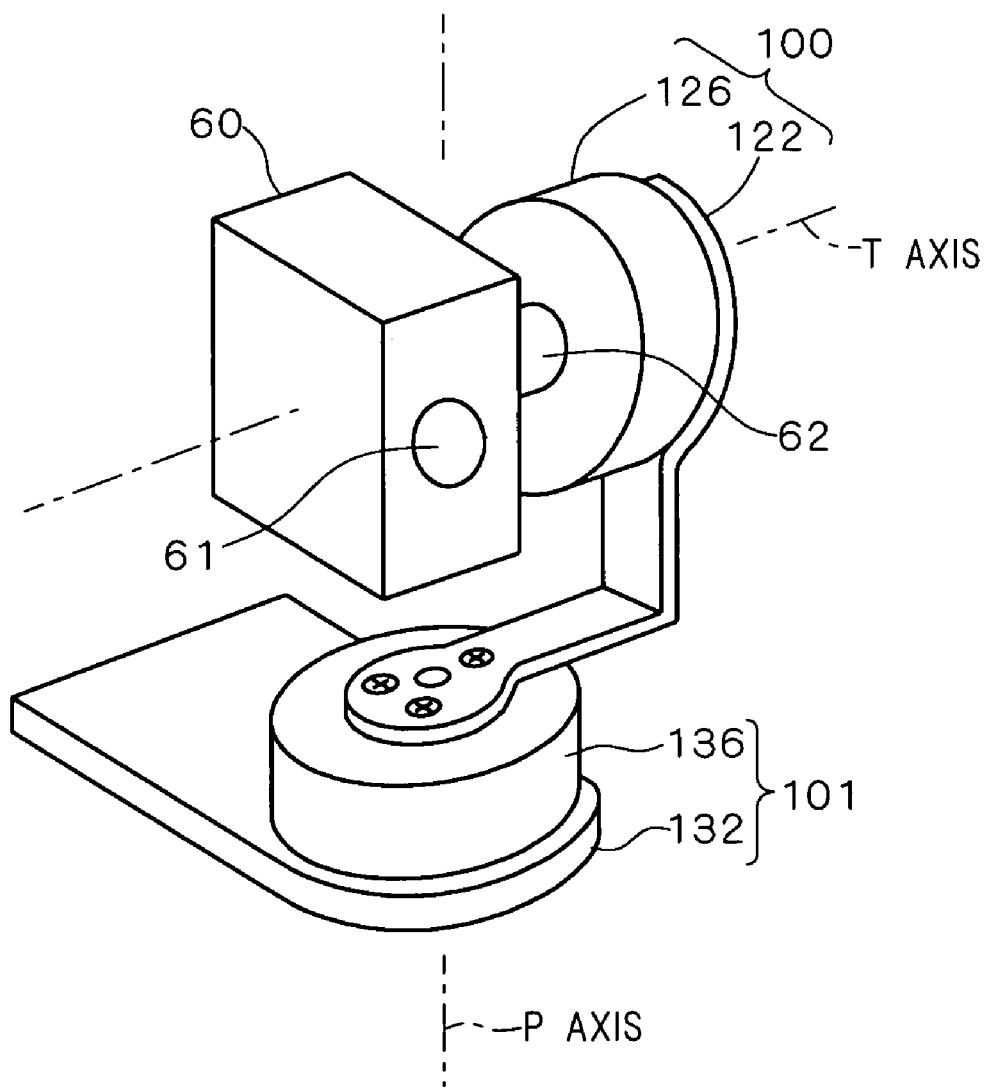
FIG. 13 is a diagram illustrating the swing mechanism using a truss-structured actuator.

FIG. 13 is a diagram for explaining the swing mechanism 40A using the truss-structured actuator.

As shown in FIG. 13, in the swing mechanism 40A, two truss-structured actuators 100 and 101 are used. One of the trussed actuators 100 and 101 is used for the panning operation and the other is used for the tilting operation. The truss-structured actuator 100 for the tilting operation has a tilt rotor 126 and a tilt stator 122 for rotatably supporting the tilt rotor 126. The truss-structured actuator 101 for the panning operation has a pan rotor 136 and a pan stator 132 for rotatably supporting the pan rotor 136. The configuration of the truss-structured actuators 100 and 101 is shown in FIG. 14. The same configuration is used for the tilting operation and the panning operation.

The image capturing unit 60 is the same as the image capturing unit 60 shown in FIG. 2. Since the image capturing unit 60 and the tilt rotor 126 are coupled to each other via a support 62, the image capturing unit 60 rotates around a T axis (tilting axis) by the rotation of the tilt rotor 126. The other end of the tilt stator 122, to which the tilt rotor 126 is fixed, is fixed to the pan rotor 136. Therefore, in association with the rotation of the pan rotor 136, the image capturing unit 60 and the truss-structured actuator 100 for the tilting operation integrally rotate around a P axis (panning axis). The pan stator 132 is fixed to the housing 11 or the like of the surveillance camera 10.

Figure 14A:
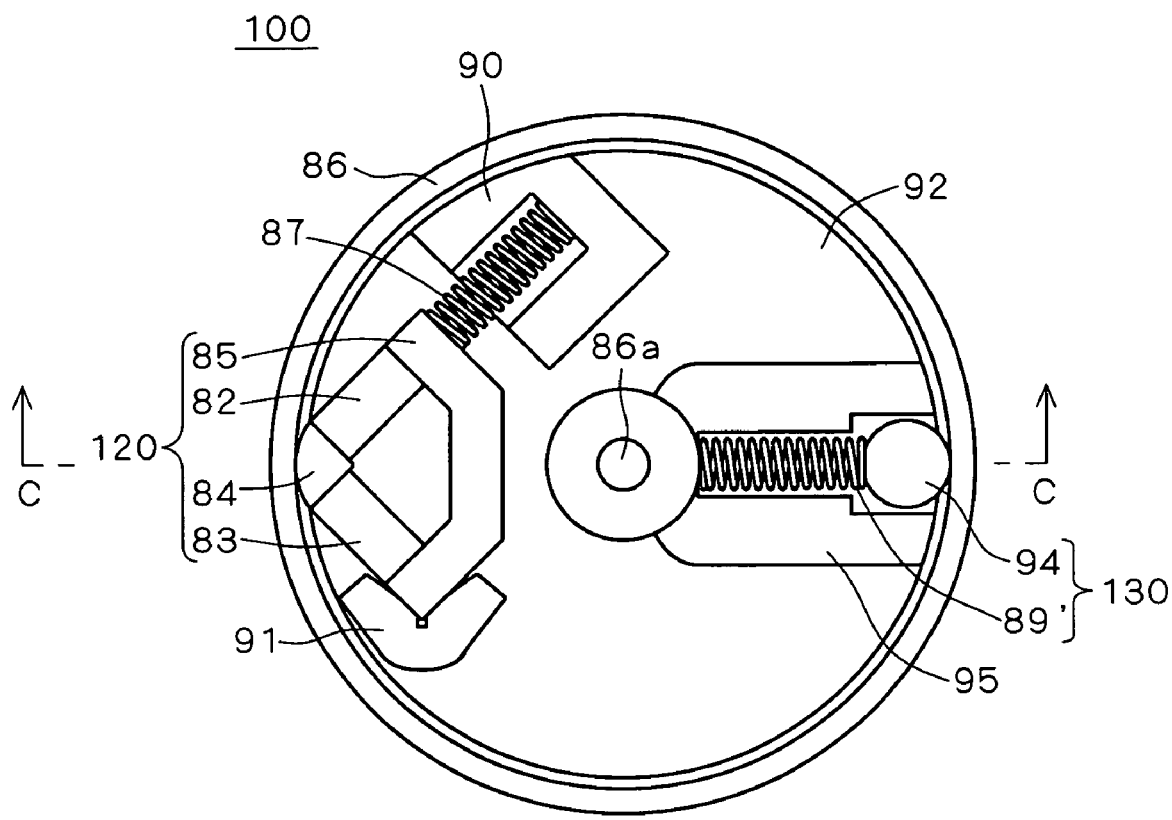
FIG. 14 is a diagram showing the configuration of the truss-structured actuator.
Figure 14B:
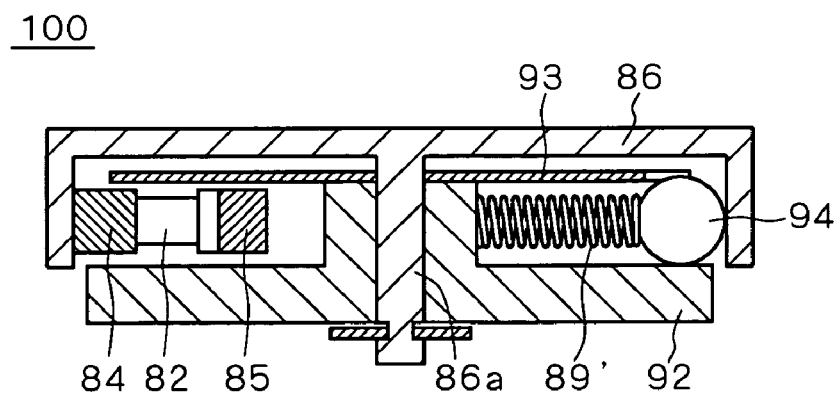

FIGS. 14A and 14B are diagrams showing the configuration and the operation principle of the truss-structured actuator 100. Since the truss-structured actuators 100 and 101 have similar configurations and operation principles, the truss-structured actuator 100 for the tilting operation will be described as an example. FIG. 14A is a cross section of the truss-structured actuator 100. FIG. 14B is a cross section taken along line C-C of the truss-structured actuator 100 shown in FIG. 14A.

The truss-structured actuator 100 has first and second piezoelectric devices (displacement devices) 82 and 83, a chip member (member to be displaced) 84, a base member 85, a rotor (member to be driven) 86, a pressure spring (first pressure member) 87, a rigid ball 94, and a pressing spring (second pressure member) 89'.

A drive unit 120 is constructed by the first and second piezoelectric devices 82 and 83, chip member 84, and base member 85. A pressing member 130 is constructed by the rigid ball 94 and the pressing spring 89'. In a position axially symmetrical with a rotor rotation axis 86a of a portion in which the chip member 84 and the rotor 86 (in this case, the tilt rotor 126) are in contact with each other, there is a portion in which the rigid ball 94 and the rotor 86 are in contact with each other. The rigid ball 94 is held by a base 92 movably in the radial direction of the rotor 86.

The rigid ball 94 is pressed by the pressing spring 89' to the rotor 86. The pressing spring 89' is, for example, a helical compression spring. One end of the pressing spring 89' is in contact with the base 92, and the other end is in contact with the rigid ball 94. In order to regulate the direction of pressing the rotor 86, the rigid ball 94 and the pressing spring 89' are surrounded by a regulating member 95 and it is set so that a load for pressing the rotor 86 is applied in one direction.

A force of pressing the rotor 86 by the chip member 84 and a force of pressing the rotor 86 by the rigid ball 94 are almost balanced. A pressing force of the pressing spring 89' is set so that a load in one direction does not work on the rotation axis 86a of the rotor 86 and a bearing portion. Since a frictional force acting between the rigid ball 94 and the rotor 86 becomes resistance of the driving force of the actuator, it is preferable to make the frictional force as low as possible.

A preferable material of the rigid ball 94 is a material resistive to friction such as stainless steel or SUJ2 (high carbon chromium bearing steel) used for a ball bearing. Since the rigid ball 94 is a sphere, it comes into rolling contact with the rotor 86, and a coefficient of friction is set to be low. Since the rotatable rigid ball 94 is pressed to be in contact with the rotor 86 by the pressing spring 89', the rigid ball 94 can be pressed to be in contact with the rotor 86 without disturbing the rotation of the rotor 86, and a load on the rotor axis 86a can be lessened.

The principle of rotation of the rotor 86 by the actuator will now be described. By applying drive signals having a predetermined phase difference to the first and second piezoelectric devices 82 and 83, the piezoelectric devices 82 and 83 are driven with different phases, and the chip member 84 provided at the intersection of the piezoelectric devices 82 and 83 is driven so as to draw a predetermined elliptical orbit (including a circular orbit).

During the period in which the chip member 84 is driven so as to draw a predetermined elliptical orbit, the chip member 84 is in contact with the inner face (inner circumferential face) of the rotor 86 for a predetermined interval. By a frictional force acting between the chip member 84 and the inner circumferential face of the rotor 86, the rotor 86 is rotated in a predetermined direction. By inverting the deviation direction of the phase of the drive signal, the direction of the elliptical orbit indicative of the driving of the chip member 84 is inverted so that the rotation of the rotor 86 can be inverted.

Although there are various methods of changing the rotation speed of the rotor 86, in this example, it is assumed that an intermittent driving method of changing the ratio (hereinafter, referred to as "duty ratio") between time of giving the drive signal and time of intermission is employed. The duty ratio is a value of controlling the drive speed (drive speed control value) in the pan and tilt directions of the image capturing direction.

FIG. 15 is a schematic diagram showing the relationship between the duty ratio of a drive signal given to the trussed actuator and sound. In FIG. 15, the lateral axis indicates the duty ratio and percentage (%) is used as a unit. A state in which the duty ratio is 100% denotes a state where the drive signal is outputted without intermission. In this state, the rotation speed (drive speed) of the rotor 86 is the highest speed. A state in which the duty ratio is 50% is a state where time in which the drive signal is outputted, that is, the driving force is transmitted to the rotor 86 is 50%. Therefore, the smaller the numerical value of the duty ratio is, the time in which the drive signal is outputted becomes shorter, and the rotation speed of the rotor 86 becomes lower.

In FIG. 15, the vertical axis indicates noise level and the lateral axis expresses the ratio of intermittence driving (duty ratio). That is, FIG. 15 shows the relationship between the ratio of intermittence driving and the noise level.

As shown in FIG. 15, the peak of a curve indicative of noise level around the duty ratio=a (%) coincides with the peak of the audible range of the human ear. With the distance from the duty ratio=a (%), the noise level tends to decrease. The peak of the curve indicative of the noise level shown around the duty ratio=b (%) appears by resonance with a peripheral member (each of the members provided for the surveillance camera 10) due to the oscillation frequency peculiar to the rotation mechanism including the rotor 86.

When the noise permissible level is set to $S_C$ in a manner similar to the foregoing embodiment, in the range of the duty ratio higher than L (%) and lower than U (%) shown in FIG. 15 (hereinafter, "noise generation range"), the noise level exceeds the noise permissible level $S_C$. Consequently, designing has to be made so as to set the duty ratio on the outside of the noise generation range.

The present invention is not limited to the case of using the pulse motor. Also in the case of using another actuator, a range in which resonance is generated by the actuator itself or between the actuator and a device and noise becomes large exists. There is a case of using the actuator while setting the duty ratio in ranges sandwiching the resonance range. In such a case, in a manner similar to the foregoing embodiment, when the duty ratio of the actuator which is driven at lower speed than another actuator lies within the resonance range, by performing a resonance avoiding process of changing the duty ratio of the actuator driven at lower speed than another to an alternative value exceeding the upper limit value of the resonance range, effects similar to those of the foregoing embodiment can be obtained.

Although the panning operation and the tilting operation are simultaneously started at the time of changing the image capturing direction in the foregoing embodiment, the present invention is not limited thereto. In the case of shifting the drive speed of the pulse motor which is driven at lower speed than the other one to the high speed side so as not to cause resonance, the drive time of the pulse motor driven at lower speed than the other one becomes shorter than the drive time of the other one. Consequently, for example, after the driving of the pulse motor on the high speed side is started, the driving of the pulse motor on the low speed side may be started so that the driving of the pulse motor on the low speed side is finished within the drive time of the pulse motor on the high speed side.

Specifically, for example, in the case where the resonance conditions that the pan drive amount is smaller than the tilt drive amount and the pan-pulse rate (pan drive speed control value) is a value in the structural resonance range of the surveillance camera 10 are satisfied, it is sufficient to change the pan-pulse rate to an alternative value (alternative speed control value) out of the resonance range and perform driving of the pan drive amount by the pan motor 41 within the drive period of the tilt drive amount by the tilt motor 70. Even when such a configuration is employed, time required to change the image capturing direction does not become longer. Thus, while suppressing noise caused by resonance, the image capturing direction of the camera can be changed at high speed.

However, for example, in the case of changing the pan-pulse rate to an alternative value out of the resonance range, if the driving of the pan motor 41 is started and finished during driving of the tilt motor 70 without simultaneously starting the driving of the pan motor 41 and the tilt motor 70 unlike the foregoing embodiment, calculation which is complicated to a certain extent is necessary for a process of determining the drive start and finish time of the pan motor 41. Therefore, by simply almost simultaneously starting the driving of the pan motor 41 and the tilt motor 70 and completing the driving of the pan motor 41 during the driving of the tilt motor 70, the image capturing direction of the camera can be changed at high speed more easily while suppressing noise caused by resonance.

Although the image capturing direction can be changed in two directions of the pan and tilt in the foregoing embodiment, the present invention is not limited thereto. For example, the image capturing direction may be variously changed by two or more driving means.

While the invention has been shown and described in detail, the foregoing description is in all aspects illustrative and not restrictive. It is therefore understood that numerous modifications and variations can be devised without departing from the scope of the invention.

What is claimed is:

1. An image capturing apparatus comprising:
    an image capturing part for capturing an image of a subject;
    a plurality of drivers for driving said image capturing part in a plurality of directions on the basis of a plurality of drive speed control values, respectively;
    an instructor for instructing a designated amount of operation of said image capturing part;
    a detector for detecting whether or not each drive speed control value for said designated amount of operation is within a structural resonance range of said image capturing part and, if a drive speed control value for said designated amount operation is within the structural resonance range of the image capturing part, determine an alternative drive speed control value for that drive speed control value that is not within said structural resonance range from among said plurality of drive speed control values;

a changing part for changing said drive speed control value for said designated amount of operation that is within the structural resonance range of the image capturing part to said alternative drive speed control value to reduce a driving time period for said designated amount of operation; and a controller for controlling said plurality of drivers with said plurality of drive speed control values in which said drive speed control value for said designated amount of operation that is within the structural resonance range of the image capturing part is changed to said alternative speed control value.

2. The image capturing apparatus according to claim 1, wherein
said plurality of drivers are pulse motors.

3. The image capturing apparatus according to claim 2, wherein
said plurality of drive speed control values are a plurality of pulse rates given to said plurality of drivers, respectively.

4. The image capturing apparatus according to claim 1, wherein
when no drive speed control values are detected within said resonance range by said detector, said controller controls said image capturing part such that respective actions of said plurality of drivers for said designated amount of operation are almost simultaneously finished.

5. An image capturing apparatus comprising:
a first driver for changing a relative angle of an image capturing part to an image capturing apparatus body in a first direction;
a second driver for changing said relative angle in a second direction;
a controller for controlling respective driving operations of said first and second drivers;
an instructor for instructing a designated amount of change in said relative angle for attaining a designated change in an image capturing direction; and
a setting part for setting a first drive amount and a first drive speed control value for said first driver and setting a second drive amount and a second drive speed control value for said second driver on the basis of said designated amount of change in said relative angle instructed by said instructor,
wherein, when resonance conditions that:
i) said first drive amount is smaller than said second drive amount, and
ii) said first drive speed control value is within a structural resonance range of said image capturing apparatus, are satisfied, said setting part changes said first drive speed control value to an alternative speed control value out of said resonance range, and
when said resonance conditions are satisfied, said controller controls said second driver drive on the basis of said second drive speed control value and controls said first driver drive on the basis of said alternative speed control value such that said first drive amount is attained by said first driver within a time period in which said second drive amount is attained by said second driver.

6. The image capturing apparatus according to claim 5, wherein
when said resonance conditions are satisfied, said controller controls said second driver on the basis of said second drive speed control value, controls said first driver on the basis of said alternative speed control value and, controls such that the driving operation of said second drive amount by said second driver is completed after completion of the driving operation of said first drive amount by said first driver.

7. The image capturing apparatus according to claim 5, wherein
when said resonance conditions are not satisfied, said controller controls said first driver on the basis of said first drive speed control value, controls said second driver on the basis of said second drive speed control value, and controls such that driving operation of said first drive amount by said first driver and the driving operation of said second drive amount by said second driver are almost simultaneously started and thereafter almost simultaneously finished.

8. The image capturing apparatus according to claim 5, wherein
when said resonance conditions are satisfied, said setting part changes said first drive speed control value to a value larger than a maximum value of said resonance range, as said alternative speed control value.

9. The image capturing apparatus according to claim 5, wherein
said first and second drivers are first and second pulse motors.

10. The image capturing apparatus according to claim 9, wherein
said first and second drive speed control values are first and second pulse rates given to said first and second pulse motors, respectively.

11. An image capturing apparatus comprising:
a first driver for changing a relative angle of an image capturing part to an image capturing apparatus body in a first direction;
a second driver for changing said relative angle in a second direction;
a controller for controlling said first and second drivers; and
an instructor for instructing a designated amount of change in said relative angle for attaining a designated change in an image capturing direction,
wherein said controller is operable to attain said designated amount of change in said relative angle with a combination of:
a) a first control time period in which said controller controls said first and second drivers on the basis of first and second drive speed control values, respectively, and
b) a second control time period following said first time period in which said controller controls said first and second drivers while stopping one of said first and second drivers,
wherein said first and second drive speed control values are determined out of a structural resonance range of said image capturing apparatus.

12. The image capturing apparatus according to claim 11, wherein
said first and second drivers are first and second pulse motors.

13. The image capturing apparatus according to claim 12, wherein said first and second drive speed control values are first and second pulse rates given to said first and second pulse motors, respectively.

* * * * *